United States Patent [19]
Krause

[11] Patent Number: 4,565,310
[45] Date of Patent: Jan. 21, 1986

[54] METHOD AND APPARATUS FOR CUTTING LIGHT WAVEGUIDES

[75] Inventor: Dieter Krause, Munich, Fed. Rep. of Germany

[73] Assignee: Siemens Aktiengesellschaft, Berlin & Munich, Fed. Rep. of Germany

[21] Appl. No.: 609,427

[22] Filed: May 11, 1984

[30] Foreign Application Priority Data

Jun. 20, 1983 [DE] Fed. Rep. of Germany ....... 3322127

[51] Int. Cl.⁴ .............................................. C03B 37/16
[52] U.S. Cl. .......................................... 225/2; 225/96; 225/96.5
[58] Field of Search .................... 225/2, 96, 96.5, 101, 225/105, 106

[56] References Cited

U.S. PATENT DOCUMENTS

| | | | |
|---|---|---|---|
| 4,074,840 | 2/1978 | Fulenwider et al. | 225/96.5 |
| 4,118,862 | 10/1978 | Hensel | 30/183 X |
| 4,154,385 | 5/1979 | Lewis | 225/96.5 |
| 4,229,876 | 10/1980 | Doty | 225/96.5 X |
| 4,315,584 | 2/1984 | Wüstner | 225/2 |
| 4,474,319 | 10/1984 | Walker | 225/96.5 |

FOREIGN PATENT DOCUMENTS 2925070 5/1982 Fed. Rep. of Germany .

Primary Examiner—Frank T. Yost
Attorney, Agent, or Firm—Hill, Van Santen, Steadman & Simpson

[57] ABSTRACT

A method and apparatus for cutting light waveguides by clamping the waveguides into clamping devices, stressing the clamped waveguides and then notching the stressed waveguides to initiate the cutting operation. The method and apparatus include an actuation element which opens the two clamping devices, releases the tensioning device and withdraws the notching device in a particular sequence and on release of the actuation element first allows the clamping devices to grip the waveguide, then has the tensioning device pivot one of the clamping devices to apply an axial tension on the waveguide and subsequently allows the notching device to notch the waveguide to initiate the cutting operation.

13 Claims, 6 Drawing Figures

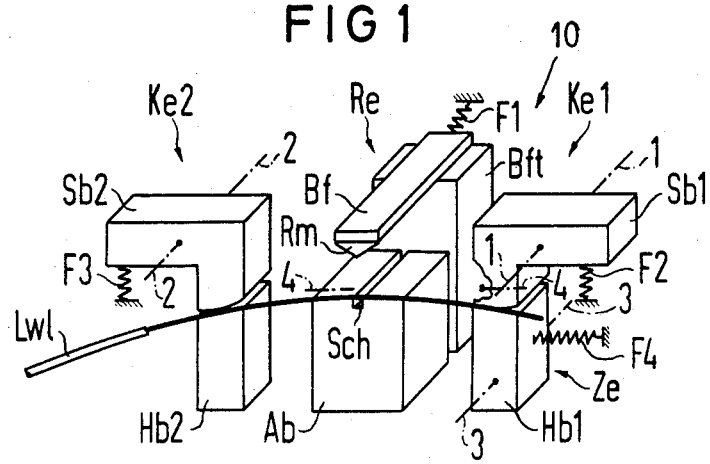
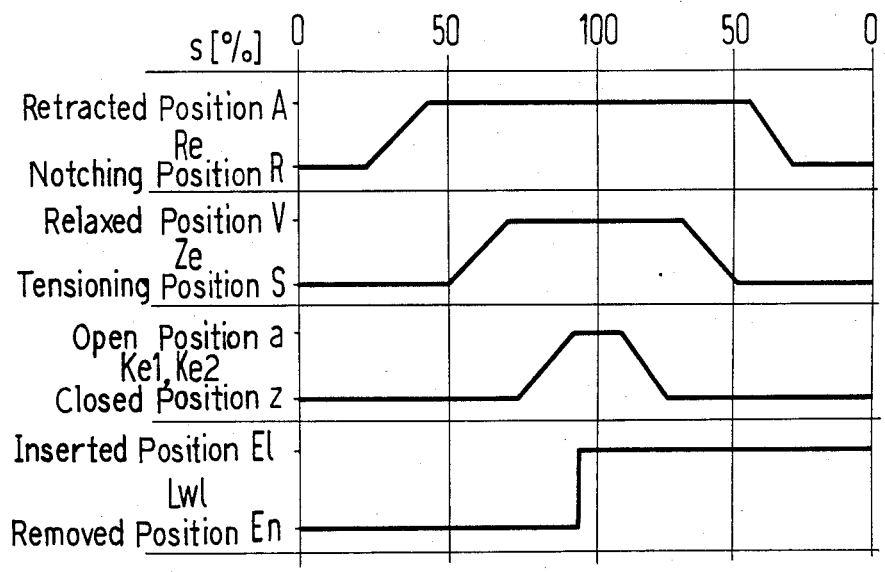

METHOD AND APPARATUS FOR CUTTING LIGHT WAVEGUIDES

BACKGROUND OF THE INVENTION

The present invention is directed to a method and apparatus for cutting light waveguides which apparatus has a pair of clamping devices arranged in spaced relationship in a frame or housing, an anvil disposed between the clamping devices, a tensioning device acting on one of the clamping devices to place a clamped waveguide in axial tension and a notching device having a tool to notch the stressed waveguide to cause cutting thereof.

A method and device which uses a pair of clamps for clamping a waveguide, has an anvil disposed between the clamps with an arrangement for creating axial tension on the waveguide as it engages the anvil and is then notched by a tool is disclosed in U.S. Pat. No. 4,315,584 which is incorporated by reference and claims priority from German application No. 2,925,070. In this device, the light waveguide to be cut is placed in the open clamping devices which are positioned on opposite sides of an anvil. Then the clamping devices are closed and the light waveguide with the assistance of a tensioning device is placed in axial tension and engage the surface of the anvil. The light waveguide in this stressed condition is subsequently notched by a notching tool of a notching arrangement, which tool operates at right angles to the longitudinal direction of the waveguide, and the notching initiating the cutting operation. After cutting, the notching means and the tensioning means are returned to their initial positions so that the light waveguide and the portion of the light waveguide that have been cut off can be removed after the clamping devices have been opened.

The end faces of the cut light waveguides, however, usually do not exhibit the precision required for further processing so that it is necessary to subsequently prepare the end faces. Particularly when cutting monomode fibers, on the average only about 30% exhibit a usable end face which has an angular deviation from the cross-axially directed face amounting to less than 1% and the quality of end face not being deteriorated or degraded by notches, cracks or other irregularities. The attainable percentage of the usable end faces thereby also largely depend on the skill of the operator of the device because the quality of the end faces depends on the adjustments and on the manner of actuation of both the tensioning arrangement and notching arrangement.

SUMMARY OF THE INVENTION

The object of the present invention is to improve the method and apparatus for cutting light waveguides by notching a waveguide that is under axial tension so that a constantly high quality of end faces of the cut light waveguides is achieved independent of the skill of the operator of the device.

To accomplish these goals, the invention is directed to an improvement in the method for cutting a light waveguide, which method comprises providing a pair of clamping devices, an anvil between the clamping devices, a notching device with a notching tool and a tensioning device acting on one of the clamping devices and/or anvil to place a clamped waveguide in axial tension. The method includes clamping the waveguides in the clamping device, actuating the tension device to place the clamped waveguide in contact with the anvil and in axial tension to form a stressed waveguide and then actuating the notching device to notch the stressed waveguide to initiate the cutting step. The improvement comprises placing each of the clamping devices in an opened position, the tension device to a non-stressing or relaxed position and the notching device to a withdrawn or retracted position in a preselected sequence, then positioning the waveguide in the clamping devices to extend across the anvil and subsequently actuating in the desired or selected sequence the clamping device to grip the waveguides, then the tensioning device to axially stress the clamped waveguide and then finally the notching device to notch the stressed waveguide to initiate the cutting operation.

The apparatus for accomplishing the method comprises a housing or frame; a pair of clamping means for gripping a waveguide being mounted in the frame in spaced relationship to each other and having means biasing the clamping means from an open position into a clamping or closed position; an anvil being mounted in the frame between the pair of clamping means with a surface for engaging a waveguide gripped by the clamping means; tension means for acting on one of the clamping means to axially stress a waveguide and having means for urging the tension means toward a tensioning position from a relaxed or non-stressing position; notching means having a tool coacting with the anvil to notch a stressed waveguide to initiate a cutting thereof, said notching means including means urging the tool from a retracted position toward the anvil to notch the stressed waveguide; and an actuation element mounted in the frame for moving between a first and second position, said element engaging each of the clamping means, tension means and notching means when the element moves from the first position toward the second position to move the tool to the retracted position, the tension means to the relaxed position and the clamping means to the open position to enable loading a waveguide into the apparatus and upon moving from the second position back to the first position sequentially allowing the clamping means to move to the closed position to grip the waveguide in the clamping means then allowing the tensioning means to shift to the tensioning position to axially stress the waveguide and finally allows the tool to move toward the anvil to notch the waveguide.

The invention is based on the perception that the manner of manipulating the actuating element remains without influence on the quality of the end face when the clamping devices, the tension means and the notching means are not automatically actuated with the actuation but with the relaxation or return stroke of the actuating element. Faultless end faces, whose regular deviation from a cross-axially directed face always lie below 1°, can be achieved with nearly 100% probability when cutting monomode fibers having a fiber core diameter below 10 μm as a result of suppressing the manual influences.

Given a preferred development of the inventive method, the clamping device in which the waveguide is restrained is opened separately after the cutting of the light waveguide. The light waveguide can thus be removed when the end face of the light waveguide and the cutoff portion of the light waveguide have moved somewhat apart in the cutting event because of the clamping means being shifted to the tensioning position by the tensioning means. In contrast thereto, the danger exists when opening the clamping device via the actuation of the shared actuating elements that the end face of the light waveguide and the severed portion of the light waveguide end will touch when the tensioning means move to a relaxed position and possibly damage the end face of the light waveguide.

Preferred developments as mentioned hereinabove include an arrangement for separately opening the clamping means having the waveguide with the cut face. Preferably, both of the clamping means can be independently and separately opened without actuation of the actuating element. The actuation element is designed as a plate-like member typically connected on the frame or wall of the housing and movable between the first and second position, each of the separate opening arrangements are buttons or tabs which extend through openings in the plate of the actuation element.

In a preferred embodiment, the notching tool is a chisel which is secured on the end of a leaf-spring which is mounted on a carrier that is pivoted around an axis which extends parallel to the light waveguide. To bias or urge the pivotal spring carrier toward the notching position, a spring element is provided.

Preferably, each of the clamping devices include a fixed jaw and a movable jaw which is mounted for pivotal movement around an axis which extends at right angles to the axis of the waveguide. Each of the movable jaws is urged by a spring element toward the clamping position. The tensioning means acts on one of the clamping devices wherein the whole clamping device is pivotally mounted to move around an axis extending at right angles to the axis of the waveguide and is urged toward the position to provide a stress on the waveguide by a spring. To move the tensioning means to a relaxed or non-stressed position, the actuating element preferably has a cam member which engages the clamping means and pivots it toward the relaxed or non-stressed position. In a similar manner, the element carries a spring element which engages the carrier of the spring for the notching tool to bias the notching tool to the retracted position and each of the movable jaws of the clamping arrangement include pins engaging the actuation element as is moved toward the second position to rotate the clamping jaws on their particular axis to the open position.

BRIEF DESCRIPTION OF THE DRAWINGS

FIG. 1 is a schematic illustration of the major parts of an apparatus for cutting light waveguides in accordance with the present invention;

FIG. 2 is a graphic illustration showing the movement of the two clamping devices, the tensioning device and the notching device as an actuation element of the present invention moves from the first to the second position and then back to the first position;

DESCRIPTION OF THE PREFERRED EMBODIMENTS

Figure 3:
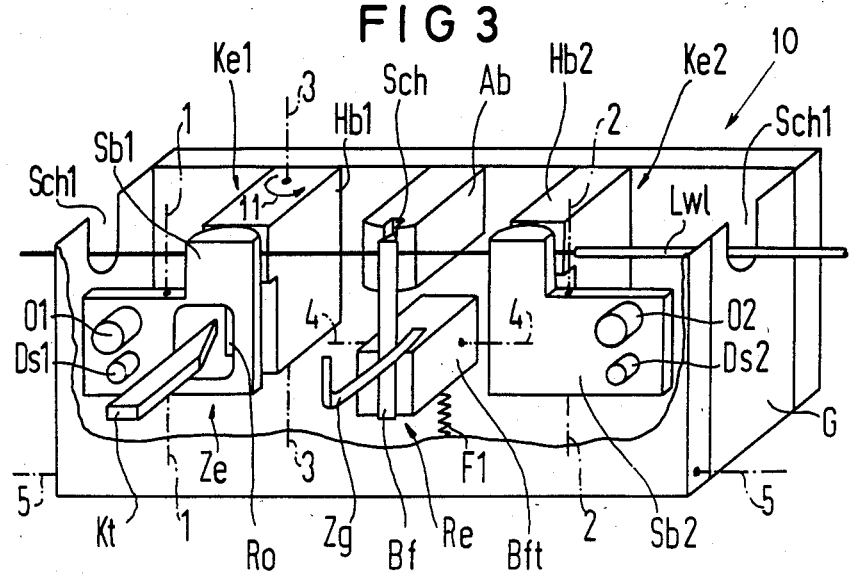
FIG. 3 is a perspective view of the apparatus with portions broken away for purposes of illustration of the present invention.
Figure 4:
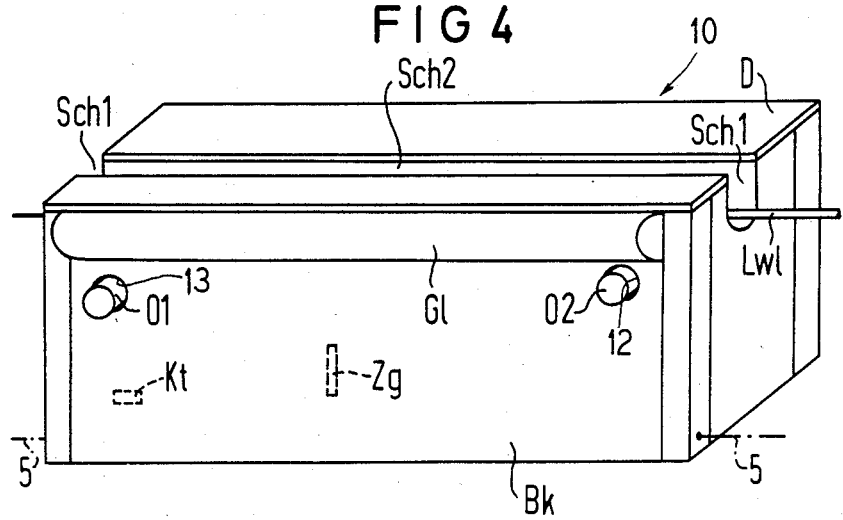
FIG. 4 is a perspective view of the apparatus or device illustrated in FIG. 3.

The principles of the present invention are particularly useful in an apparatus 10 for cutting light waveguides of FIGS. 3 and 4 and whose major parts are schematically illustrated in FIG. 1. Briefly, the apparatus of FIG. 1 includes two clamping means or devices Ke1 and Ke2 for gripping a light waveguide Lw1, which is to be cut; a tensioning means or device Ze for applying an axial tension on the light waveguide Lw1 as it is held in contact with an anvil Ab; and a notching device or means Re, which has a notching tool, such as a chisel Rm, arranged to apply a notch extending at right angles to the axis of the light waveguide Lw1 as it lies on a surface of the anvil Ab.

As illustrated in FIG. 1, a first clamping device Ke1 is disposed on one side of the anvil Ab while a second clamping device Ke2 is disposed on the other side. The clamping device Ke1 has a fixed or retained jaw Hb1 and a movable or clamping jaw Sb1 which is pivotally mounted to pivot on an axis 1—1, which axis extends substantially transverse to the axis of the light waveguide Lw1. The clamping or movable jaw Sb1 moves between a first or open position to a second position which is a closed or clamping position which is illustrated in the drawing. The clamping device or means Ke1 include means to bias the movable jaw Sb1 toward the second or closed position and this means is illustrated as a spring F2 which is designed as a compression spring. In the second or closed position, the light waveguide is then fixed between the retained or fixed jaw Hb1 and the movable jaw Sb1 by the dynamic effect of the spring F2.

The second clamping device Ke2, which is on the opposite side of the anvil Ab, also includes a retained or fixed jaw Hb2 and the clamping or movable jaw Sb2 which is pivoted around an axis 2—2 that also extends at right angles to the axis of the waveguide Lw1. As with the movable jaw Sb1, the jaw Sb2 moves from a first or open position to a second position which is a closed or clamping position which is shown in the drawings. The clamping device Ke2 includes means for biasing or urging the movable jaw Sb2 to the second position and this means comprises a spring F3 which is also a compression spring. When the jaw is in the second position as illustrated, the light waveguide Lw1 will be clamped and gripped between the fixed jaw Hb2 and the movable jaw Sb2 with the clamping force being provided by the spring F3.

In order to apply tension, the tensioning means or device Ze is formed by the first clamping device Ke1 which can be pivoted in toto around an axis 3—3 that is aligned to extend at right angles to the axis of the waveguide Lw1. The clamping device Ke1 can therefore be pivoted around the axis 3—3 between a first or relaxed position to a second or tensioning position. As illustrated, a spring F4, which is a tension spring, provides means to urge the clamping device Ke1 to the second position which is the tensioning position to apply an axial tension onto the light waveguide. As illustrated, the stress acts in an axial direction and is generated in the region of the light waveguide Lw1 lying between the clamping devices Ke1 and Ke2 and the stress is generated and created by the tensioning means Ze moving the clamping device Ke1 to the tensioning or second position.

The notching means Re, as mentioned above, include a notching chisel Rm which is secured to a leaf-spring Bf. The leaf-spring Bf is in turn secured to a leaf-spring carrier Bft that is mounted for pivotal movement around an axis 4—4 which extends parallel to the light waveguide Lw1. Thus, the notching means Re can be pivoted around the axis 4—4 against the force of a spring F1 to a first or withdrawn position in which the notching chisel Rm is disposed at a distance from the light waveguide Lw1. The spring force of the spring F1 will bias the notching means toward a second or notching position so that the notching chisel Rm will form a notch extending at right angles to the light waveguide L1 which is stretched on the anvil Ab and provided a radial advance that thus initiates the cutting event.

The anvil Ab comprises a cylindrically curved seating surface whose axis extends at right angles to the axis of the waveguide Lw1. The surface also has a slot Sch which extends parallel to the axis of the curved surface and at right angles to the axis of the waveguide. The slot Sch lies in the notching plane of the notching chisel Rm and thus promotes an approximately symmetrical stress distribution in the cross-sectional light waveguide Lw1 at the notching location.

The apparatus as illustrated in FIG. 1 is provided with a single actuation element which is not illustrated in FIG. 1 but which will move between a first and second position. As the actuation element is moved to the second position, the notching means Re is moved to a retracted position, the tension means Ze is moved to a non-stressing or retracted position and each of the movable jaws Sb1 and Sb2 of the clamping devices Ke1 and Ke2, respectively, are moved to an open position. In a corresponding manner, when the actuation element moves from the second position back to the first position, it sequentially closes the movable jaws of the clamping devices to grip the waveguide such as an optical fiber, then moves the tensioning means to apply axial tension on the gripped waveguide and subsequently moves the notching means to notch the stressed fiber to start or initiate the cutting operation.

The relationship in the movement of each of these means or devices is graphically illustrated in FIG. 2 wherein the abscissa s shows the amount of movement from the first position to the second position which occurs with 100% movement and then back to the first position. It can also be characterized as being the actuation path s which is subdivided from an actuation stroke of zero through 100% as the element moves from the first to the second position and into a return stroke of zero through 100% occurring during relaxation of the pressure on the actuation element to cause it to move from the second position back to the first position. The ordinate of the graph is divided into four groups with each group being assigned one of the devices or means; for example, the movement of the notching means Re; movement of the tensioning means Ze; movement of the clamping devices Ke1 and Ke2; and finally the condition or position of the waveguide Lw1.

For the notching means Re, the ordinate is subdivided into two positions with the retracted or lift-off position A and a notching position R, which position R is when the chisel Rm is notching a stressed fiber engaging the surface of the anvil. As graphically illustrated, the tool or chisel Rm is in the notching position R when the actuation element is in the first position. As the element moves from the first position toward the second position and has proceeded through approximately 25% of the stroke, the chisel is shifted from the notching position and lifted to the retracted position A. It is noted that this movement is completed at about 40% of the actuation stroke during the movement between the first and second position and that the chisel is held in the retracted position A until approximately 60% of the movement of the return stroke from the second to the first position for the actuation element. At this point, the chisel or tool is shifted from the retracted position A toward the notching position R with this occurring with about 30% left in the return stroke.

The positions for the tensioning means are also subdivided into a tensioning position S and an initial non-stressing or relaxed position V which occurs before tensioning. As the actuation element is shifted between the first and second positions, the tensioning means is in the tensioning position for approximately 50% of the initial stroke from the first toward the second position. Then, the tensioning means is shifted from the tensioning position toward the relaxed position V with this occurring at approximatly 65% of the stroke. With continual movement to the second position, the tensioning means is held in the relaxed position or non-stressing position V. During the return stroke, the tensioning means is maintained in the non-stressing position V until about 35% of the return stroke has been completed. Then it is allowed to return to the tensioning position S with the tensioning position being achieved with approximately 50% of the return stroke completed and thus tensioning is applied on the waveguide during the final 50% movement of the actuation element from the second position toward the first position.

During the movement of the actuation element, the clamping elements Ke1 and Ke2 will be shifted between an open position a and a closed position z. As in the previous description, when the actuation member is in the first position, the clamping elements are in the closed position z so that a waveguide will be gripped between the jaws. With the movement of the actuation element from the first position toward the second position and after approximately 75% of the stroke, the clamping elements are shifted or moved toward the open position a with the opening be completed at approximately 90% of the stroke toward the second position. After the actuation element is in the second position and during the first approximately 10% of the return stroke from the second back to the first positions, the movable jaws will be held in the open position a. After approximately 10% of the return stroke, the movable jaws are allowed to shift from the open position a toward the closed position z to grip a waveguide disposed therein. The jaws will reach the closed position z after approximately 25% of the return stroke and will be maintained in this closed position z to grip a waveguide for the remaining 75% of the return stroke to the first position.

As illustrated, the light waveguide can be either in a removed position En or in an inserted position E1. Thus, during the first 90° of the stroke from the movement of the actuation element between the first and second positions, the light waveguide Lw1 is held out of the device. After 90%, the waveguide can be inserted into the open jaws of the clamping devices Ke1 and Ke2 and in contact with the anvil Ab. After completion of the stroke, the waveguide is loosely received in the open jaw until after approximately the first 10 to 25% of the return stroke when the jaws will move into gripping engagement on the waveguide. With further movement such at about 35% of the return stroke, the tensioning means will shift the clamping device Ke1 from a retracted or non-stressing position to a tensioning position which is completed at about 50% of the return stroke. All during the movement of the return stroke, the notching means Re and its tool Rm have been in a retracted position a. At about 60% of the return stroke of the movement of the actuation member from the second position back toward the first position, the notching means Re will be moved from a retracted position A toward the notching position R with this being accomplished with about 30% of the return stroke remaining. With the notching, the cutting of the waveguide is initiated.

Assuming that the waveguide portion gripped in the clamping device Ke1 is the portion being severed from the waveguide Lw1, then it is desirable that the clamping device Ke2 is provided with a separately actuated means for opening the clamping device and to shift the clamping jaw Sb2 toward the open position while the tensioning device Ze maintains the tension on the severed portion gripped in the clamping device Ke1. By providing such an independently actuated opening arrangement, possible damage to the end face of the waveguide by the tensioning device assuming the relaxed or unstressed position is suppressed.

As best illustrated in FIGS. 3 and 4, the apparatus 10 for cutting the light waveguides has the various elements illustrated in FIG. 1. The apparatus 10 has a cuboid housing G whose end faces are provided with a slot Sch1 and has an upper cover D with a longitudinal slot Sch2 that extends between the slots Sch1,Sch1 to provide a longitudinally extending opening to allow insertion of the waveguide Lw1. As illustrated in FIGS. 3 and 4, the front side of the housing G is essentially formed by an actuation element comprising a plate or flap Bk which is mounted for pivotal movement on an axis 5 between the first position illustrated in FIG. 4 and also in bold lines in FIGS. 5 and 6 to a second position shown in chain lines in FIGS. 5 and 6.

Figure 5:
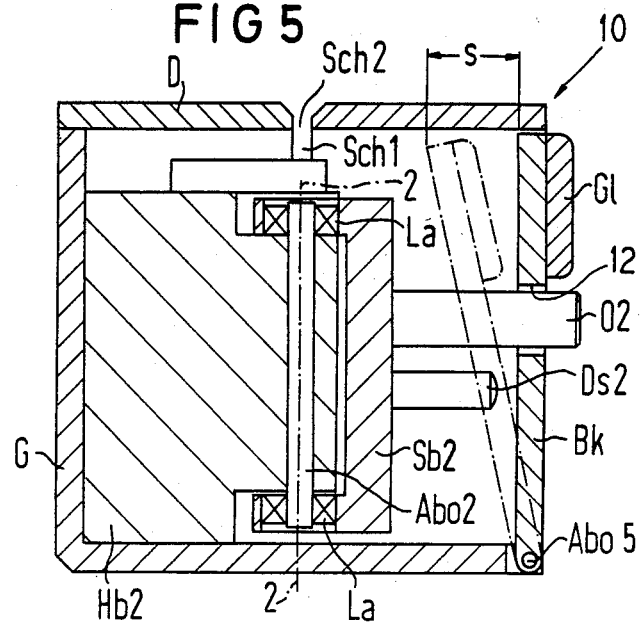
FIG. 5 is a cross-sectional view of the apparatus of FIG. 3 with portions in elevation for purposes of illustration taken through the axis II—II of one of the clamping devices.
Figure 6:
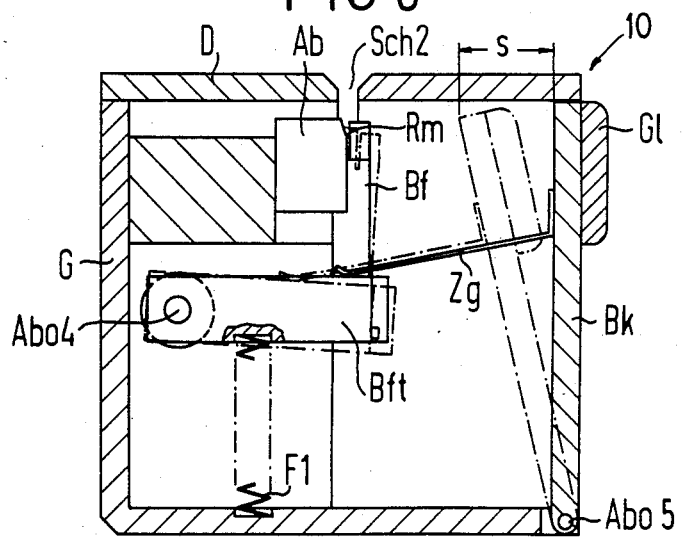
FIG. 6 is a cross-sectional view of the apparatus of FIGS. 3 and 4 with portions in elevation taken adjacent the notching device.

The actuation element or front plate Bk has a leaf-spring-like intermediate member Zg, which is secured to an inside wall and has a free end engaging the spring carrier Bft of the notching means Re. As best illustrated in FIG. 6, with movement of the actuating element Bk from the first position illustrated in bold lines toward the second position illustrated in chain lines, the spring-like element Zg will pivot the carrier Bft against the force of the spring to a position which is the retracted position A of FIG. 2 for the tool Rm. It is noted that the leaf-spring-like intermediate member Zg is then only elastically deformed during the remainder of the actuation stroke. For the actuation of the clamping devices Ke1 and Ke2, a cylindrical thrust member Ds1 or Ds2, is secured on each of the movable jaws Sb1 and Sb2, respectively. During the actuation stroke, as best illustrated in FIG. 5 with the plate Bk moving from the first toward the second position, the plate Bk engages the thrust member such as Ds2 to cause the movable jaw Sb2 to pivot from the second closed position against the spring force toward the open position. Thus, the movable jaws will move from the closed position z to the open position a illustrated in FIG. 2.

For the actuation of the tensioning means Ze, a link carrier Kt is applied on the back surface of the actuation element Bk. The link carrier Kt has a tapering wedge-like end or cam surface and extends through an opening provided in the movable jaw Sb1 to engage a roller Ro attached to the retaining jsw Hb1. Thus, with movement of the element Bk from the first toward the second position, the cam-like end of the link carrier Kt will engage the roller Ro and cause the entire clamping device Ke1 to pivot from the position illustrated in FIG. 3 toward a retracted or non-stressing position V which occurs with the pivoting around the axis 3 as indicated in the direction of the arrow 11.

When the actuation element Bk is moved through the stroke s from the first position to the second position which is shown in chain lines in FIGS. 5 and 6, each of the movable clamps Sb1 and Sb2 have been shifted from a closed position to the open position, the notching means Re have been shifted from the notching position to a retracted position and the tensioning means Ze have been shifted from a tensioning position to a non-stressing position. Thus, the waveguide such as the fiber Lw1, can be inserted into the apparatus with the fiber positioned between the anvil and the tool Rm and between the jaws Sp1 and Sp2 and the fixed jaws Hb1 and Hb2, respectively. With the release of a holding force on the actuation element Bk, it will shift along the return stroke from the second position back to the first position to automatically clamp the waveguides between the fixed and movable jaws of each of the clamping devices, apply an axial tension to the waveguide to form a stressed waveguide and then subsequently notch the stressed waveguide to initiate the cutting event. After the cutting event has been initiated by the cross-axial notching, the clamping device Ke2 is separately opened by means of a cylindrical opening member 02 which is mounted on the clamping jaw Sb2 and extends through an aperture 12 in the actuation element Bk. Once the opening member 02 has been actuated, the light waveguide Lw1 can be removed. The severed portion of the light waveguide can also be removed after the clamping device Ke1 has been opened by a separately actuated opening member 01 which is mounted on the clamping jaw Sb1 and extends through another opening 13 in the actuation element Bk.

As best illustrated in FIG. 5, the axis 2—2 for the clamping device is formed by an axle pin Abo2 which is mounted in the fixed jaw Hb2. The clamping or movable jaw Sb2 is mounted to rotate on the axle pin Abo2 by bearings La. It is noted that the actuation element Bk is provided with a handle strip G1 and can pivot around an axle pin Abo5 which corresponds to the axis 5—5 of FIGS. 3 and 4. As mentioned above, the dot-dash or chain line position is the second position for maximum actuation of the stroke or path s. As illustrated in FIG. 6, the axis 4—4 for the notching means Re is formed by an axle pin Abo4 which mounts the leaf-spring carrier Bft for pivotal movement in the housing G of the device. When the actuation member Bk is in the second position which is illustrated in chain lines, the leaf-spring element Zg urges the leaf-spring carrier Bft to the retracted position shown in clain lines against the force of the spring F1. In this position, the leaf-spring Bf is shifted to a position shown in chain lines to retract the chisel-like tool Rm away from the anvil Ab.

Upon release of the actuation element Bk, the springs such as F1, F2, F3, F4 and F5 acting through the various points will cause the actuation element Bk to be shifted from the second position back to the first position shown in bold lines. Thus, with the release of a holding force on the actuation element Bk, the movable jaws of the clamping devices Ke1 and Ke2 are shifted to a clamping position to grip the waveguide disposed therebetween, the tensioning means Ze is shifted to pivot the clamping device Ke1 toward a tensioning position opposite the direction of the arrow 11 of FIG. 3 and finally the notching device Re will move the tool Rm to a position for notching the stressed waveguide. As mentioned hereinabove with regard to FIG. 2, these movements of the various devices occur in a time sequence which is automatically achieved without regard to the operators of the device and thus an improved quality for the cut faces is achieved.

Although various minor modifications may be suggested by those versed in the art, it should be understood that I wish to embody within the scope of the patent granted hereon, all such modifications as reasonably and properly come within the scope of my contribution to the art.

I claim:

1. In a method for cutting a light waveguide by notching a stressed waveguide to start the cutting operation, said method comprising the steps of providing a pair of clamping devices, an anvil between the clamping devices, a notching device having a notching tool, and a tension device acting on one of the anvil and clamping devices to place the clamped waveguide in tension to form a stressed waveguide, clamping the waveguides in the clamping devices, actuating the tension device to place the clamped waveguides in contact with the anvil and in axial tension to form a stressed waveguide and actuating the notching device to notch the stressed waveguide to initiate the cutting operation, the improvements comprising in one step placing the clamping device in an open position, the tension device in a non-stressing position and the notching device in the retracted position, then positioning a waveguide between the jaws of the clamping device to extend across the anvil and then sequentially actuating the clamping devices to grip the waveguide, then actuating the tensioning device to axially stress the waveguide, finally actuating the notching device to notch the stressed waveguide to initiate the cutting operation, and then subsequent to the completion of the cutting operation separately releasing the waveguide from one of the clamping devices without releasing the other clamping device, the tensioning device and the notching device so that the waveguide in the one clamping device is removed without damaging the cut end face.

2. An apparatus for cutting light waveguides by notching the waveguide held in axial tension on an anvil, said apparatus comprising a housing, a pair of clamping means for gripping a waveguide being mounted in the housing in spaced relationship to each other and having means biasing the clamping means from an open position to a clamping position; an anvil being mounted in a housing between the pair of clamping means with the surface for engaging a waveguide gripped in the clamping means; tension means for acting on one of the clamping means to axially stress a waveguide and having means to urge the tensioning means toward a tensioning position from a non-stressing position; notching means having a tool coacting with the anvil to notch a stressed waveguide to initiate a cutting therof, said notching means including means urging the tool from a retracted position toward the anvil to notch the waveguide disposed therebetween; and an actuation element mounted in the housing for movement between a first and a second position, said element engaging each of the clamping means, tension means and the notching means when the element moves from the first position toward the second position to move the tool to the retracted position, the tension means to the non-stressing position and each of the clamping means to the open position to enable loading a waveguide in the apparatus and upon moving from the second position toward the first position sequentially allowing the clamping means to move to the clamping position to grip the waveguide in the clamping means, then allows the tensioning means to shift to a tension position to axially stress the waveguide and subsequently allows the tool to move toward the anvil to notch and initiate the cutting of the stressed waveguide.

3. An apparatus according to claim 2, wherein at least one of the two clamping devices includes a separate member to enable shifting the clamping means to an open position without changing the position for the other clamping means, the tensioning means and the notching means.

4. An apparatus according to claim 3, wherein the actuation element comprises a pivotally mounted plate member forming a portion of the housing.

5. An apparatus according to claim 4, wherein the separate opening member extends through an opening in the actuation element.

6. An apparatus according to claim 2, wherein the tool of the notching means comprises a notching chisel secured to a leaf-spring, said leaf-spring being secured to a leaf-spring carrier that is mounted for pitoval movement in the housing on an axis extending parallel to the light waveguide.

7. An apparatus according to claim 6, wherein the actuation element has a leaf-spring-like intermediate member attached thereto, the free end of said intermediate member engaging the leaf-spring carrier of the notching means to pivot it from the notching position toward the retracted position.

8. An apparatus according to claim 2, wherein each of the clamping means includes a fixed jaw and a movable clamping jaw, said movable jaw being pivotally mounted on the fixed jaw to move on an axis extending at right angles to the axis of the waveguide.

9. An apparatus according to claim 8, wherein each of the movable jaws has a thrust member engaged by the actuating element as it is moved from the first toward the second position to cause pivoting of the movable jaws from the closed position to the open position.

10. An apparatus according to claim 2, wherein the tension means comprises one of the clamping means mounted for pivotal movement in the housing on an axis extending at right angles to the light waveguide and spring means urging the one clamping means toward a tensioning position.

11. An apparatus according to claim 10, wherein the actuation element has a link carrier engaging the one clamping means to pivot it against the spring means to the non-stressed position.

12. An apparatus according to claim 2, wherein the anvil has a curved seating surface having a curvature on an axis extending at right angles to the axis of the waveguide.

13. An apparatus according to claim 12, wherein the curved surface of the anvil has a slot extending at right angles to the axis of the waveguide at a position aligned with the tool of the notching means.

* * * * *